United States Patent
Dow et al.

(10) Patent No.: US 8,769,221 B2
(45) Date of Patent: Jul. 1, 2014

(54) PREEMPTIVE PAGE EVICTION

(75) Inventors: Eli M. Dow, Poughkeepsie, NY (US); Marie R. Laser, Poughkeepsie, NY (US); Charulatha Dhuvur, Poughkeepsie, NY (US); Jessie Yu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1019 days.

(21) Appl. No.: 11/969,281

(22) Filed: Jan. 4, 2008

(65) Prior Publication Data

US 2009/0177854 A1 Jul. 9, 2009

(51) Int. Cl.
*G06F 12/00* (2006.01)
*G06F 13/00* (2006.01)
*G06F 13/28* (2006.01)

(52) U.S. Cl.
USPC .................. 711/160; 711/159; 711/E12.001

(58) Field of Classification Search
CPC ........................ G06F 12/0804; G06F 12/122
USPC .................... 711/160, 159, E12.001
See application file for complete search history.

(56) References Cited

U.S. PATENT DOCUMENTS

| | | | | |
|---|---|---|---|---|
| 4,186,438 | A * | 1/1980 | Benson et al. | 711/113 |
| 5,493,663 | A * | 2/1996 | Parikh | 711/159 |
| 5,860,095 | A | 1/1999 | Iacobovici et al. | |
| 6,047,363 | A | 4/2000 | Lewchuk | |
| 6,330,556 | B1 * | 12/2001 | Chilimbi et al. | 1/1 |
| 6,427,228 | B1 * | 7/2002 | Wigger | 717/111 |
| 6,775,745 | B1 * | 8/2004 | Fry et al. | 711/134 |
| 6,813,691 | B2 | 11/2004 | Gaither et al. | |
| 6,886,085 | B1 | 4/2005 | Shuf et al. | |
| 6,968,429 | B2 | 11/2005 | Civlin | |
| 7,096,321 | B2 | 8/2006 | Modha | |
| 2004/0088691 | A1 * | 5/2004 | Hammes et al. | 717/158 |
| 2004/0143814 | A1 * | 7/2004 | de Jong | 717/104 |
| 2006/0069876 | A1 * | 3/2006 | Bansal et al. | 711/134 |
| 2007/0043908 | A1 | 2/2007 | Diefendorff | |
| 2007/0079072 | A1 | 4/2007 | Collier et al. | |
| 2008/0215815 | A1 * | 9/2008 | Dombrowski et al. | 711/122 |
| 2009/0150593 | A1 * | 6/2009 | Hamilton et al. | 711/101 |

OTHER PUBLICATIONS

Milenkovich, M. et al., "Compiler and Run-time Hints for Memory Management", IBM Technical Disclosure Bulletin, Jan. 1990, 3p, IBM, Yorktown, New York, United States.
Smaragdakis, Y. et al., "EELRU: Simple and Effective Adaptive Page Replacement" Proceedings of 1999 International Conference on Measurement and Modeling of Computer Systems, 1999, 12p.

(Continued)

*Primary Examiner* — Sheng-Jen Tsai
(74) *Attorney, Agent, or Firm* — Cantor Colburn LLP; Steven Chiu

(57) ABSTRACT

A method, system, and computer program product for preemptive page eviction in a computer system are provided. The method includes identifying a region in an input file for preemptive page eviction, where the identified region is infrequently accessed relative to other regions of the input file. The method also includes generating an output file from the input file, where the identified region is flagged as a page for preemptive page eviction in the output file. The method further includes loading the output file to a memory hierarchy including a faster level of memory and a slower level of memory, wherein the flagged page is preemptively written to the slower level of memory.

12 Claims, 4 Drawing Sheets

(56) References Cited

OTHER PUBLICATIONS

Yanev, Kliment., "Cache Replacement Algorithms in Web Caches-Caching of Various Media Types", Thesis University of Helsinki, May 8, 2005, 26 p, University of Helsinki Dept. of Computer Science, Helsinki, Finland.

Wang, Zhenlin, et al., "Using the Compiler to Improve Cache Replacement Decisions," Proceedings of the 2002 International Conference of Parallel Architectures and Compilation Techniques, Copyright 2002, 10 p.

Rik Van Riel, "Page replacement in Linux 2.4 memory management," Proceedings of the FREENIX Track: 2001 USENIX Annual Technical Conference, Jun. 2001, 9 p.

Bhattacharjee, A. et. al., "A new web cache replacement algorithm", 2005 IEEE Pacific Rim Conference on Communications, Computers and Signal Processing, (PACRIM) (IEEE Cat. No. 05CH37690), pp. 420-423.

* cited by examiner

PREEMPTIVE PAGE EVICTION

BACKGROUND OF THE INVENTION

1. Field of the Invention

The present disclosure relates generally to computer system memory management, and, in particular, to preemptive page eviction in computer system memory.

2. Description of Background

Computer system memory management techniques typically seek to improve overall processing throughput by managing memory utilization. When multiple levels of memory (e.g., processor cache, main memory, and secondary storage) are available to store program code and/or data, it is generally preferable to store frequently accessed items in the fastest available memory type. Memory can be organized as pages, with memory management performed over multiple pages for a software process. An operating system may track which pages are active as a working set for the software process being executed. Memory managers attempt to swap pages in and out of various levels of memory to improve both speed and accessibility.

Memory managers often employ time-based algorithms to determine which code or data segments should be allocated to faster memory versus slower memory. One commonly used algorithm is least recently used (LRU), which tracks aging information to determine what to swap out over a period of time. Another approach is least frequently used (LFU), which determines access frequency of items and swaps out infrequently accessed items as established via time based monitoring of access patterns. While multiple memory management algorithms exist, many such algorithms require a large amount of computational and storage overhead. Predictive memory management algorithms often rely on monitoring access patterns to manage the contents of pages at different levels of memory. Due to a lack of a priori knowledge about the contents of memory pages, memory managers can make poor decisions that allow infrequently accessed information to be placed in faster memory for long durations of time, as it is initially unknown as to whether the information will be frequently or infrequently accessed.

While writing a software application, a programmer may be able to identify regions of code that are likely to be infrequently accessed. It would be beneficial to relay such information to a memory manager, enabling the memory manager to perform more efficiently. Support for a markup methodology to identify infrequently accessed regions of code would enable the memory manager to preemptively evict pages to a lower level of memory (e.g., secondary storage), thereby preventing infrequently accessed code/data from occupying valuable storage resources in a higher level of memory (e.g., main memory) for extended period of time. Accordingly, there is a need in the art for preemptive page eviction in computer system memory.

BRIEF SUMMARY OF THE INVENTION

Embodiments of the invention include a method for preemptive page eviction in a computer system. The method includes identifying a region in an input file for preemptive page eviction, where the identified region is infrequently accessed relative to other regions of the input file. The method also includes generating an output file from the input file, where the identified region is flagged as a page for preemptive page eviction in the output file. The method further includes loading the output file to a memory hierarchy including a faster level of memory and a slower level of memory, wherein the flagged page is preemptively written to the slower level of memory.

Additional embodiments include a system for preemptive page eviction. The system includes a processor in communication with a memory hierarchy, and an operating system executing on the processor. The memory hierarchy includes a faster level of memory and a slower level of memory. The operating system performs a method that includes loading an application to the memory hierarchy, where the application includes a page flagged for preemptive page eviction. The method performed by the operating system further includes writing the flagged page to the slower level of memory preemptively.

Further embodiments include a computer program product for generating an output file for preemptive page eviction in a computer system. The computer program product includes a storage medium readable by a processing circuit and storing instructions for execution by the processing circuit for implementing a method. The method includes identifying a region in an input file for preemptive page eviction, where the identified region is infrequently accessed relative to other regions of the input file. The method also includes generating an output file from the input file. The identified region is flagged as a page for preemptive page eviction in the output file. The method further includes storing the output file.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments provide preemptive page eviction (PPE) in computer system memory. A paged memory system can swap pages or blocks of memory contents between multiple memory devices. Using memory pages allows an operating system (OS) to support virtual memory, where memory in different physical devices appears as a contiguous address range. An OS can use a memory manager in hardware and/or software to swap the contents of pages between slower memory devices (e.g., hard disk drive) and faster memory devices (e.g., main memory). Page eviction is the process of removing the contents of a memory page, generally from faster memory to slower memory. When a large application is initially loaded into main memory, it may contain pages of code and/or data that are not actually accessed during normal program execution. Copying infrequently accessed content into faster memory wastes valuable system resources. The memory manager may eventually discover that the infrequently accessed content should be evicted after a period of time and a number of calculations. However, using exemplary embodiments of the present invention, infrequently accessed pages can be identified and prevented from being written to faster memory. PPE avoids the initial period of wasted time and calculation resources that would otherwise be required to identify and evict an unused page after it is needlessly written to faster memory and allowed to remain until a time based algorithm identifies the unused page.

In exemplary embodiments, a markup construct is employed to identify content that is expected to be infrequently accessed. A programmer can apply the markup construct to sections of code and/or data during software development. The markup construct may be explicit in defining the beginning and end of a region of code/data, or programming-language scoping rules can define the region. In alternate exemplary embodiments, the markup construct is included inherently for particular programming language constructs, such as an exception handler. Development tools, including compilers, linkers, and the like, can detect the markup constructs. In response to the markup constructs, the development tools partition and flag output files such that a final application resulting from the code and/or data supports PPE for the identified content. The final application can be partitioned with blocks of binary code grouped in close proximity to one another in isolated pages. Flags or other indicia are used to identify pages for preemptive eviction. When the OS encounters a page identified for preemptive eviction, it can immediately swap out the page to slower memory and bypass standard page relocation strategies. Further details regarding PPE are provided herein.

Figure 1:
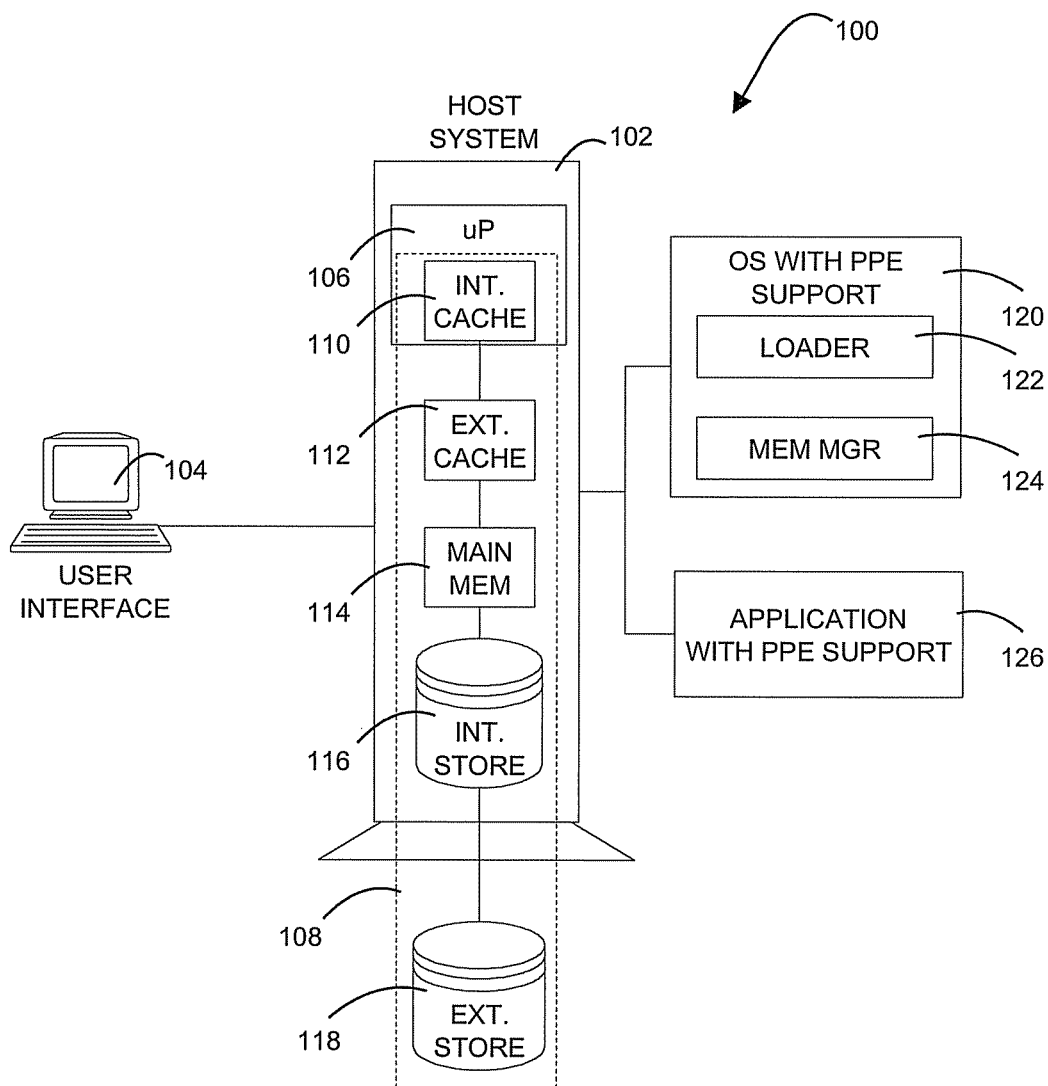
FIG. 1 depicts a system for preemptive page eviction in accordance with exemplary embodiments.

Turning now to the drawings, it will be seen that in FIG. 1 there is a block diagram of a computer system 100 upon which PPE is implemented in exemplary embodiments. The computer system 100 of FIG. 1 includes a host system 102 in communication with a user interface 104. In exemplary embodiments, the host system 102 includes at least one processing circuit (e.g., microprocessor (μP) 106) capable of reading and executing instructions, and handling interaction requests from the user interface 104. The user interface 104 can include a variety of I/O devices, such as a keyboard and display device, enabling user interaction with the host system 102. Users can initiate various tasks on the host system 102 via the user interface 104, such as executing application programs. While only a single host system 102 is shown in FIG. 1, it will be understood that multiple host systems can be implemented, each in communication with one another via direct coupling or via one or more networks. For example, multiple host systems may be interconnected through a distributed network architecture. The single host system 102 may also represent a cluster of hosts collectively performing processes as described in greater detail herein.

The host system 102 uses a memory hierarchy 108 to access and store information, including executable code and/or data. The memory hierarchy 108 can include numerous memory technologies operating at different speeds and in varying amounts. For example, the memory hierarchy 108 may contain multiple levels of memory (arranged from faster to slower speed), including: internal cache 110, external cache 112, main memory 114, internal storage 116, and external storage 118. The internal cache 110 and external cache 112 are relative to the μP 106, such as L1 and L2 processor cache. The main memory 114 represents the primary physical storage area for programs executed by the μP 106 and can be divided into multiple banks of memory. In exemplary embodiments, the main memory 114 is a volatile memory technology, i.e. random access memory (RAM). The internal storage 116 and external storage 118 are defined relative to the host system 102 and are referred to collectively as secondary storage. In exemplary embodiments, the internal storage 116 and external storage 118 are non-volatile storage devices, such as hard disk drives. All of the memory in the memory hierarchy 108, or a subset thereof, may support paged memory and PPE.

The μP 106 executes an operating system 120 that supports PPE. In exemplary embodiments, the OS 120 includes a loader 122 and a memory manager 124. In alternate exemplary embodiments, the loader 122 and/or the memory manager 124 are independent of the OS 120. The OS 120 enables loading and execution of one or more application programs, such as application 126. The application 126 supports PPE, including flags or metadata that identify executable code and/or data blocks for PPE. The application 126 may initially reside in non-volatile memory, for instance the internal storage 116 or the external storage 118, prior to loading and execution. The OS 120 can use the loader 122 to load the application 126 into pages of the main memory 114. In exemplary embodiments, the memory manager 124 controls swapping of the page contents in the memory hierarchy 108. For example, the memory manager 124 can monitor access requests to pages stored within the internal storage 116 and/or external storage 118, and swap pages to the main memory 114 upon an access request. Similarly, the memory manager 124 may determine that a page in the main memory 114 has not been accessed for a sufficient duration, and in response thereto swap the page contents to secondary storage to free up space in the main memory 114. Upon loading the application 126, the OS 120 can identify pages of the application 126 that are flagged for PPE. Using the loader 122 and/or the memory manager 124, the flagged pages of the application 126 are written directly to slower memory of the memory hierarchy 108, such as the internal storage 116 and/or external storage 118. In alternate exemplary embodiments, the flagged pages of the application 126 are initially written to the main memory 114 but flagged for immediate eviction. The memory manager 124 identifies the pages flagged for immediate eviction in the main memory 114 and swaps them to slower memory of the memory hierarchy 108. The same process can be applied between any levels of the memory hierarchy 108, such as the internal cache 110 and the external cache 112.

Figure 2:
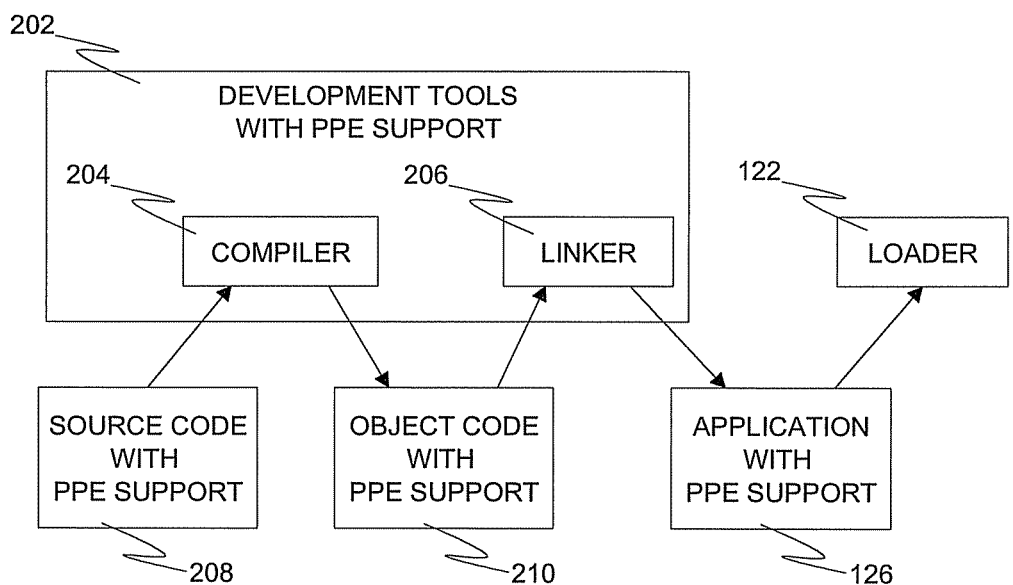
FIG. 2 depicts development tools and code for preemptive page eviction in accordance with exemplary embodiments.

Turning now to FIG. 2, development tools 202 and code supporting preemptive page eviction are depicted in accordance with exemplary embodiments. The development tools 202 may be executed on the host system 102 of FIG. 1 to generate the application 126. While the development tools 202 include a compiler 204 and a linker 206, it will be understood that additional software development tools can also be included as part of the development tools 202, which are not depicted in FIG. 2. For example, the development tools 202 can include an interactive graphical editor as part of an integrated development environment (IDE) for graphically identifying markup constructs on the user interface 104 of FIG. 1. In exemplary embodiments, the development tools 202 read an input file, such as source code 208, and generate an output file with PPE support, e.g., application 126. The development tools 202 can also generate other output files, including object code 210.

In exemplary embodiments, the source code 208 includes one or more regions that are identified for PPE. A region may be identified for PPE based on a user (e.g., a programmer) determining that the region will have a low access frequency (including not accessed at all) relative other regions of the source code 208. Alternatively, the development tools 202 can identify PPE regions, even when no explicit regions are defined in the source code 208. Each PPE region can be identified using one or more markup constructs, such as beginning and ending markups, scoping rules, and/or an inherent definition for a programming language. PPE regions can also be identified using analysis features of the development tools 202, such as automatically inserting mark-up constructs in regions that are inaccessible or were not executed when running a previously compiled version of the source code 208. The compiler 204 may be instrumented to always treat specific regions, e.g., a catch block, as regions to be evicted as an inherent definition for a programming language of the source code 208. The development tools 202 can use additional data, such as profiling data, to identify regions for PPE without using explicit markup constructs. The additional data can be generated from a previous compilation or output from a separate code analysis tool (not depicted) that identifies infrequently accessed regions based on a simulation or execution of the previously compiled version of the source code 208. Using analysis tools and/or historical data, the development tools 202 can identify regions for PPE that were not explicitly identified by a programmer, modifying the source code 208, object code 210 and/or application 126 accordingly.

An example using beginning and ending markups to explicitly define a region for PPE is presented as follows:

```
try {
    new File(filename).createNewFile( );
} catch (IOException e) {
    /*__PEVICT */
    System.out.println("Unable to
    create "+filename+": "+e.getMessage( ));
    /*__EPEVICT */
}
```

The following example applies scoping rules to determine the end of scope for a PPE region:

```
try {
    new File(filename).createNewFile( );
} catch (IOException e) {
    /*__PEVICT */
    System.out.println("Unable to
    create "+filename+": "+e.getMessage( ));
}
```

A further example for a derived language using explicit beginning and ending markups is as follows:

```
IF RC=0 THEN DO;
    code....
END;
ELSE DO;
    @PEVICT;
    code.....
```

```
    @EPEVICT;
END;
```

Using scoping:

```
IF RC=0 THEN DO;
    code....
END;
ELSE DO;
    @PEVICT;
    code ....
END;
```

Further examples written in C programming language include using explicit beginning and ending markups:

```
if (x == 1) {
    return;
} else {
    /*__PEVICT */
    printf("area for eviction\n");
    /*__EPEVICT */
}
```

Using scoping:

```
if(x == 1) {
    return;
} else {
    /*__PEVICT */
    printf("area for eviction\n");
}
```

A #pragma statement provides yet another exemplary alternative for establishing beginning and ending markups:

```
#pragma __PEVICT
    chunk of code marked for eviction
#pragma __EPEVICT
```

In exemplary embodiments, the compiler 204 outputs the object code 210, which is used by the linker 206 to create the application 126. The source code 208, object code 210, and application 126 can include metadata to identify or otherwise flag regions for PPE support. The compiler 204 can interpret metadata in the source code 208 and add metadata to the object code 210. The linker 206 can interpret metadata in the object code 210 and add metadata to flag pages in the application 126 for PPE. To build the application 126, there may be multiple input source code files that are compiled and linked, i.e., multiple source code 208 and object code 210 files. The linker 206 coalesces the application 126 into page aligned sections to isolate identified region for PPE from the other non-PPE regions. When multiple regions are identified for PPE, they may be grouped into contiguously packed page aligned regions to ease the burden on the OS 120 of FIG. 1, such that full pages can be swapped rapidly to slower level memory in the memory hierarchy 108 without disturbing other regions.

Figure 3:
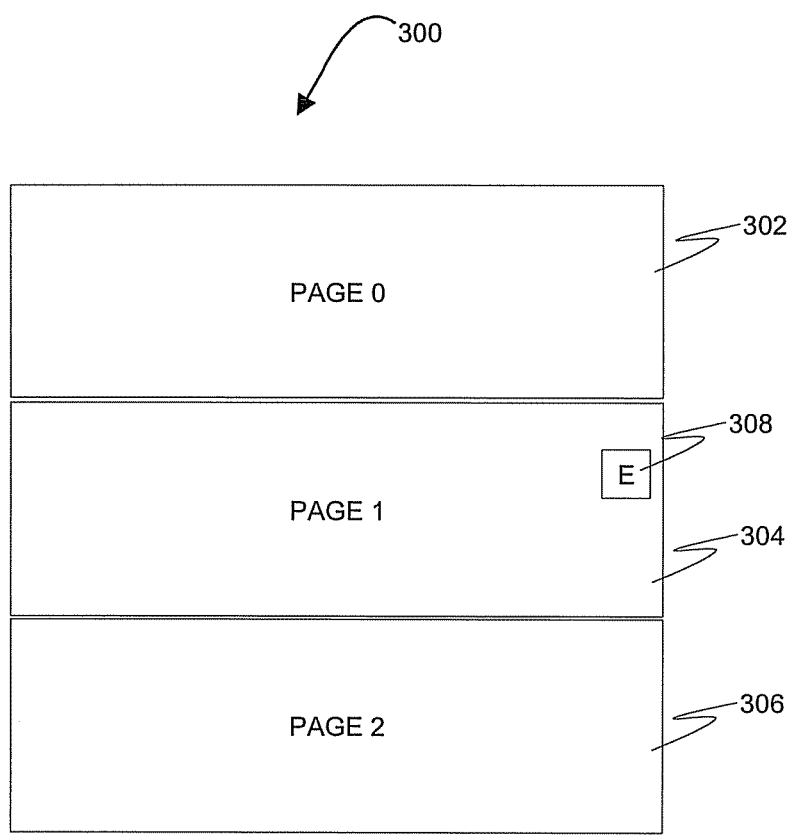
FIG. 3 depicts memory pages including a preemptive page eviction indicator in accordance with exemplary embodiments.

Turning now to FIG. 3, memory pages 300 associated with the application 126 of FIG. 1 are depicted in accordance with exemplary embodiments. The memory pages 300 include page zero 302, page one 304, and page two 306. The memory pages 300 can exist at any level of the memory hierarchy 108 of FIG. 1. While only three pages are depicted in FIG. 3, it will be understood that any number of memory pages with multiple flagged pages for PPE are included within the scope of the invention. In the example depicted in FIG. 3, page one 304 includes a flag E 308 indicating that the page is marked for preemptive eviction. When the OS 120 encounters the flag E 308 on page one 304, the OS 120 can immediately write page one 304 to a slower level of memory in the memory hierarchy 108. For example, in preparing to execute the application 126, the OS 120 can use the loader 122 to write the application 126 to the main memory 114 of FIG. 1 as memory pages 300. The OS 120 may initiate the memory manager 124 to manage movement of pages in and out of the main memory 114. The memory manager 124 can immediately identify the flag E 308 on page one 304 and swap the contents of page one 304 to a slower level of secondary storage, such as the internal storage 116 or the external storage 118. As time elapses, the memory manager 124 may apply other algorithms known in the art, e.g., LRU, LFU, and the like, to discard contents of the other pages in the memory pages 300. If a branch to page one 304 is detected, the memory manager 124 can swap page one 304 from a slower level of memory back to a faster level of memory, for instance, back to the main memory 114 or into internal cache 110.

Figure 4:
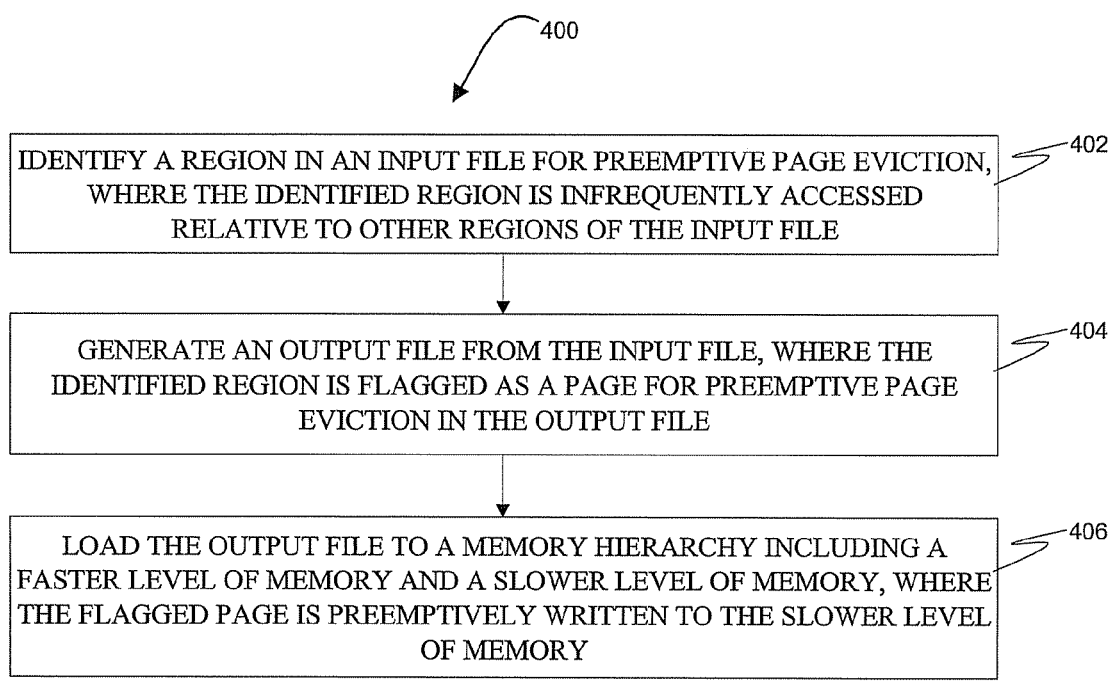
FIG. 4 depicts an exemplary process for preemptive page eviction.

Turning now to FIG. 4, a process 400 for PPE in the computer system 100 of FIG. 1 will now be described in accordance with exemplary embodiments, and in reference to FIGS. 1-3. At block 402, the development tools 202 of FIG. 2 are used to identify a region in an input file for PPE, such as source code 208. Via the user interface 104, a software programmer can identify the region for PPE as code that is expected to have a low frequency of access relative to other regions of the input file.

At block 404, the development tools 202 generate an output file from the input file, with the identified region flagged as a page for PPE in the output file. The development tools 202 can generate the application 126 in a page format (e.g., memory pages 300 with flag E 308) from the source code 208 for the memory hierarchy 108.

At block 406, the OS 120 loads the output file (e.g., application 126) to the memory hierarchy 108, where the flagged page (e.g., page one 304) is preemptively written to a slower level of memory in the memory hierarchy 108 (e.g., internal storage 116 or external storage 118). The OS 120 may use a combination of the loader 122 and the memory manager 124 to load and write the application 126 to the memory hierarchy 108. The OS 120 can initially write the flagged page to a faster level of memory and then swap the flagged page to a slower level of memory prior to monitoring page access patterns in the faster level of memory. For instance, page one 304 can be written to main memory 114 and upon detection of the flag E 308, the OS 120 swaps page one 304 to internal storage 116 before running an LRU or LFU algorithm on the main memory 114.

Technical effects of exemplary embodiments include identifying one or more regions of input files for preemptive page eviction and performing preemptive page eviction. Advantages include reducing wasted time and resources associated with writing pages to a faster level of memory and waiting for a time based algorithm to eventually determine that the pages should be moved to a slower level of memory. Using exemplary embodiments, regions of code that are expected to be accessed infrequently are either directly written to a slower level memory or flagged for immediate removal to a slower level memory.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for preemptive page eviction in a computer system, the method comprising:
   identifying a region in an input file for preemptive page eviction, wherein the identified region is infrequently accessed relative to other regions of the input file;
   generating an output file from the input file, prior to loading one of the input file and the output file into a memory hierarchy, wherein the identified region is flagged as a page for preemptive page eviction in the output file; and
   loading the output file to the memory hierarchy, the memory hierarchy including a faster level of memory and a slower level of memory, wherein the loading comprises writing the flagged page preemptively to the slower level of memory,
   wherein the identifying is performed using one or more markup constructs to delimit the identified region, and
   wherein the one or more markup constructs in the input file are established using a scoping rule, and
   wherein a compiler and a linker detect the one or more markup constructs and partition and flag the output file such that an application supports preemptive page eviction for the identified region.

2. The method of claim 1 further comprising:
   coalescing the output file into page aligned sections to isolate the identified region from the other regions.

3. The method of claim 1 wherein the faster level of memory is main memory and the slower level of memory is secondary storage.

4. A system for preemptive page eviction, comprising:
a processor configured to communicate with a memory hierarchy that includes a faster level of memory and a slower level of memory;
an operating system configured to operate on the processor to perform a method comprising:
generating an application from an input file, prior to loading one of the input file and the application into memory, wherein one or more regions in the input file are flagged as at least one page for preemptive page eviction in the application;
loading the application to the memory hierarchy, wherein the application includes the at least one page flagged for preemptive page eviction; and
writing the at least one flagged page to the slower level of memory preemptively,
wherein the flagging is performed using one or more markup constructs to delimit the one or more flagged regions, and
wherein the one or more markup constructs in the input file are established using a scoping rule; and
development tools comprising a compiler and a linker configured to detect the one or more markup constructs and partition and flag an output file such that the application supports preemptive page eviction for the at least one page.

5. The system of claim 4 wherein the development tools are configured to support identifying a region in the input file for preemptive page eviction.

6. The system of claim 5 wherein the development tools are configured to perform a method comprising:
generating the application from the input file, wherein the identified region maps to the flagged page for preemptive page eviction.

7. The system of claim 6 wherein the development tools are configured to perform the method that further comprises:
coalescing the application into page aligned sections to isolate the identified region from other regions.

8. The system of claim 4 wherein the faster level of memory is main memory and the slower level of memory is secondary storage.

9. A computer program product for generating an output file for preemptive page eviction in a computer system, the computer program product comprising:
a storage medium readable by a processing circuit and storing instructions for execution by the processing circuit for implementing a method, the method comprising:
identifying a region in an input file for preemptive page eviction, wherein the identified region is infrequently accessed relative to other regions of the input file;
generating an output file from the input file, prior to loading one of the input file and the output file into memory, wherein the identified region is flagged as a page for preemptive page eviction in the output file; and
storing the output file,
wherein the identifying is performed using one or more markup constructs to delimit the identified region, and
wherein the one or more markup constructs in the input file are established using a scoping rule, and
wherein the one or more markup constructs are configured to be detected by a compiler and a linker to partition and flag the output file such that an application supports preemptive page eviction for the identified region.

10. The computer program product of claim 9 implementing the method further comprising:
coalescing the output file into page aligned sections to isolate the identified region from the other regions.

11. A computer program product for performing preemptive page eviction in a computer system, the computer program product comprising:
a storage medium readable by a processing circuit and storing instructions for execution by the processing circuit for implementing a method, the method comprising:
generating an application from an input file, prior to loading one of the input file and the application into memory, wherein one or more regions in the input file are flagged as at least one page for preemptive page eviction in the application;
loading the application including a page flagged for preemptive page eviction to a memory hierarchy, wherein the memory hierarchy includes a faster level of memory and a slower level of memory; and
writing the flagged page to the slower level of memory preemptively,
wherein the flagging is performed using one or more markup constructs to delimit the one or more regions, and
wherein the one or more markup constructs in the input file are established using one or more of a scoping rule, and
wherein the one or more markup constructs are configured to be detected by a compiler and a linker to partition and flag an output file such that the application supports preemptive page eviction for the flagged page.

12. The method of claim 1, wherein the input file comprises source code, and wherein the region is identified by a programmer of the source code.

* * * * *